United States Patent
Shinagawa et al.

(10) Patent No.: US 6,754,436 B1
(45) Date of Patent: Jun. 22, 2004

(54) APPARATUS FOR TIMER RECORDING OF A PROGRAM AND METHOD FOR TIMER RECORDING OF A PROGRAM

(75) Inventors: Yasufumi Shinagawa, Saitama (JP); Noboru Motoyoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/274,363

(22) Filed: Mar. 23, 1999

(30) Foreign Application Priority Data

Mar. 27, 1998 (JP) ......................................... P10-081683

(51) Int. Cl.$^7$ ................................................ H04N 5/91
(52) U.S. Cl. ......................................... 386/83; 725/58
(58) Field of Search ...................... 386/1, 83; 348/734; 725/58; 455/185.1, 186.1

(56) References Cited

U.S. PATENT DOCUMENTS

| | | | | |
|---|---|---|---|---|
| 4,193,120 A | * | 3/1980 | Yello ........................... 700/16 |
| 4,625,080 A | * | 11/1986 | Scott ...................... 379/102.03 |
| 4,786,982 A | * | 11/1988 | Wakahara et al. ............. 386/81 |
| 4,866,542 A | * | 9/1989 | Shimada et al. ............... 360/71 |
| 5,031,213 A | * | 7/1991 | Kawasaki .................... 348/678 |
| 5,056,070 A | * | 10/1991 | Shibuya et al. ............... 368/10 |
| 5,293,357 A | * | 3/1994 | Hallenbeck ................... 360/69 |
| 5,414,756 A | * | 5/1995 | Levine ..................... 379/88.23 |
| 5,479,266 A | * | 12/1995 | Young et al. ................ 348/734 |
| 5,537,106 A | * | 7/1996 | Mitsuhashi ............ 340/825.72 |
| 5,805,763 A | * | 9/1998 | Lawler et al. ................. 386/83 |
| 5,835,665 A | * | 11/1998 | Grossmeyer .................. 386/46 |
| 5,850,218 A | * | 12/1998 | LaJoie et al. ................. 725/45 |
| 6,137,950 A | * | 10/2000 | Yuen ........................... 386/83 |

* cited by examiner

Primary Examiner—Thai Tran
Assistant Examiner—Polin Chieu
(74) Attorney, Agent, or Firm—Jay H. Maioli

(57) ABSTRACT

A program timer-recording apparatus and a program timer-recording method times-activated record a desired program by operating less general-purpose keys. A recording apparatus includes a tuner unit (1), a tuner control unit (4), a VTR unit (13), a VTR control unit (5), a timer control unit (6), a key (2), a remote controller (3), a monitor (14) and a fluorescent display tube (15). The timer control unit (6) includes an easy timer-recording setting start unit (7) energized by data entered by a key to start an easy timer-recording setting mode to thereby effect an easy timer-recording input display, a present time setting unit 8 energized by data entered by the key to indicate a value concerning easy timer-recording on the easy timer-recording input display and which determines the value concerning easy-timer recording, a start time setting unit (9), an end time setting unit (10), a channel number setting unit (11) and a timer-recording memory unit (12) for memorizing a set value determined by the setting unit, whereby a program may be recorded by a simple operation.

18 Claims, 6 Drawing Sheets

To Set Present Time

To Set Timer Start Time

To Set Timer End Time

To Set Channel

APPARATUS FOR TIMER RECORDING OF A PROGRAM AND METHOD FOR TIMER RECORDING OF A PROGRAM

BACKGROUND OF THE INVENTION

1. Field of the Invention

The present invention relates to a recording apparatus and a recording method, and particularly to a recording apparatus and a recording method in which a consumer electronic equipment such as a video tape recorder and an audio tape recorder or the like includes a program timer recording function.

2. Description of the Related Art

In order to timer-record a program of a television broadcasting and/or to timer-record a program of a radio broadcasting, it is customary that a user might employ a program record timer apparatus in which a video tape recorder (hereinafter simply referred to as a VTR) or an audio tape recorder is rendered a program timer-recording function to record a program of a television broadcasting and/or to record a program of a radio broadcasting.

This program record timer apparatus enables the user to timer-record a desired program of a television broadcasting and/or to timer-record a desired program of a radio broadcasting by using a program timer. That is, the program record timer apparatus is adapted to timer-record a desired program of a television broadcasting and/or timer-record a desired program of a radio broadcasting based on information such as date, day of week, start time, channel and end time designated by the user.

Broadcast waves from a television broadcasting station, for example, are received at an antenna and supplied to a receiving circuit. The receiving circuit comprises a high-frequency amplifier and mixer, an intermediate-frequency amplifier and a detector, for example, and is adapted to receive a video signal and an audio signal of a program being broadcast. Then, the video signal and the audio signal are supplied to a recording unit, comprised of a recording circuit and a system control circuit, thereby being recorded on a magnetic tape.

A timer-recording unit comprises a setting operation unit which enables a user to set the above-mentioned entry information, a memory unit for memorizing the entry information, a clock circuit for generating present time information, a coincidence detecting circuit for detecting whether or not a timer-recording start time, a timer-recording end time memorized in the memory unit are identical to the present time information, a recording drive circuit for supplying a recording drive signal to the system control circuit to energize a recording circuit to start the recording if the coincidence detecting circuit detects that the timer-recording start time and the present time information are coincident with each other and a recording stop circuit for supplying a recording stop signal to the system control circuit to deenergize the recording circuit to end the recording if the coincidence detecting circuit detects that the timer-recording end time and the present time information are coincident with each other.

When a user intends to timer-record a program of a television broadcasting by using the timer-recording function, if the user sets entry information such as day of week, start time, channel and end time of a desired program being recorded by the setting operation unit of the timer-recording unit, then the recording system control circuit controls the recording circuit so that the recording circuit automatically starts to record a desired program of channel being set at the start time of the day of week being set at a mode being set and ends the recording operation at the end time being set even though the user is not at home.

In this manner, according to the program timer-recording apparatus, the user should set the present date and time before the user enters information to program the timer-recording. However, it is customary that users in Southeast Asia remove the power supply cord of the apparatus from a plug socket during the apparatus is not in use such as when the users are sleeping or the like. Therefore, if the user had timer-recorded a desired program of a television broadcasting or a radio broadcasting which will be broadcast several days before, data being set would be lost. As a consequence, it becomes necessary for the user to set data to start the timer-recording a desired program on the day one more time. As described above, depending on the area, the user should enter unnecessary data and the operation becomes complicated.

Further, there is then the following disadvantage. That is, each time the apparatus should be powered, a menu picture should be displayed on the screen of the television receiver in an OSD (on-screen display) fashion and prior-preparations such as setting a tuner to adjust the reception should be made, thereby requiring plenty of time for timer-activated-recording a desired program.

Furthermore, a user should operate many keys such as a menu key for opening a menu picture, up-key, down-key, left-key and right-key capable of selecting a desired entry from the menu picture and an OK key for determining a selected entry or the like. Also, the user should depress keys many times and clear many sequential steps for timer-recording a desired program. In this case, a manual for timer-recording is indispensable to the user, and an operation procedure is considerably complicated for the user.

SUMMARY OF THE INVENTION

In view of the aforesaid aspect, it is an object of the present invention to provide a recording apparatus and a recording method in which a user becomes able to timer-record a desired program by operating less general-purpose keys.

According to an aspect of the present invention, there is provided a recording apparatus which is comprised of a receiving circuit for receiving a broadcast signal from a broadcasting station, a recording circuit for recording the broadcast signal, a timer setting circuit for setting a timer-recording of a broadcast signal of a desired program contained in the broadcast signal and a control unit for controlling the recording circuit such that the recording circuit records a broadcast signal of the desired program in response to the setting of the timer setting circuit, wherein the recording apparatus includes a normal timer setting mode and an easy timer setting mode.

In accordance with another aspect of the present invention, there is provided a recording method in which a broadcast signal is received from a broadcasting station and the broadcast signal is recorded. This recording method comprises a timer setting step for effecting a timer setting in order to timer-activated-record a broadcast signal of a desired program contained in the broadcast signal, and a recording step for recording the broadcast signal of the desired program in response to the setting at the timer setting step, wherein the timer setting step includes a normal timer setting mode and an easy timer setting mode and a timer setting value based on the easy timer setting mode and a timer setting value based on the normal timer setting mode are existing in a mixed state.

BRIEF DESCRIPTION OF THE DRAWINGS

FIGS. 5A through 5D are respectively front views showing the manner which various settings are displayed on the fluorescent display tube in the easy timer setting mode according to the embodiment of the present invention, wherein:

FIG. 5A is a front view showing the manner in which a timer start time being set is displayed;

FIG. 5B is a front view showing the manner in which a present time being set is displayed;

FIG. 5C is a front view showing the manner in which a timer end time being set is displayed;

FIG. 5D is a front view showing the manner in which a channel being set is displayed;

DESCRIPTION OF THE PREFERRED EMBODIMENT

A recording apparatus according to an embodiment of the present invention will hereinafter be described with reference to the drawings.

According to this embodiment, in a home video tape recorder (home VTR) having a timer-recording function, a user becomes able to easily timer-record a desired program by using the up-key and the down-key of the main body of the VTR and ten-keys (digital keys) of the remote controller.

Initially, the timer-activated recording apparatus according to this embodiment will be described below.

Figure 1:
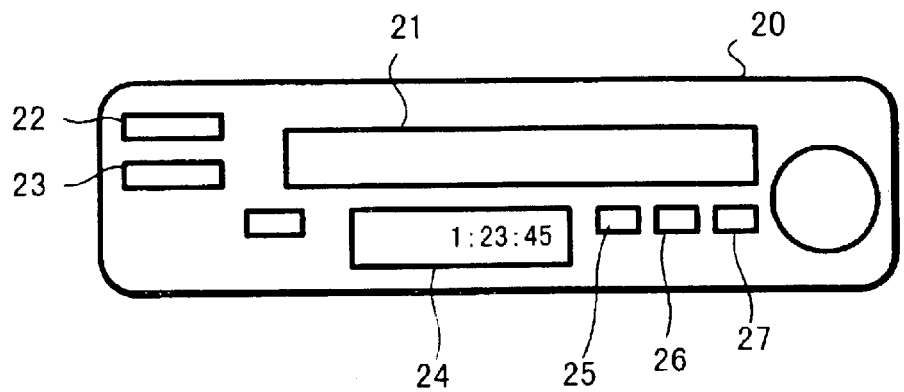
FIG. 1 is a front view showing keys of a main body according to an embodiment of the present invention.

FIG. 1 of the accompanying drawings is a front view showing keys of the main body of the VTR according to the embodiment of the present invention. As shown in FIG. 1, a main body, generally depicted by reference numeral 20, includes a tape insert/eject mouth 21, through which a cassette tape is inserted /ejected, defined at its upper central portion. The main body 20 further includes a power key 22 for turning on or off a power supply of the main body 20 and an eject key 23 for ejecting the tape cassette from the tape insert/eject mouth 21 defined on its left-hand end at the left-hand side of the tape insert/eject mouth 21.

The main body 20 includes under the tape insert/eject mouth 21 a fluorescent display tube (fluorescent character display) 24 for displaying the states in which the VTR is placed by operating various keys and operation states. On the right-hand side of the fluorescent character display 24, there are provided an easy timer set key 25 for starting the easy timer set which is the easy timer-recording setting mode peculiar to this embodiment and an up-key 26 for sequentially incrementing a numerical value in response to the number of its depression and the duration of its depression and a down-key 27 for decrementing a numerical value in response to the number of its depression and the duration of its depression, respectively.

Figure 2:
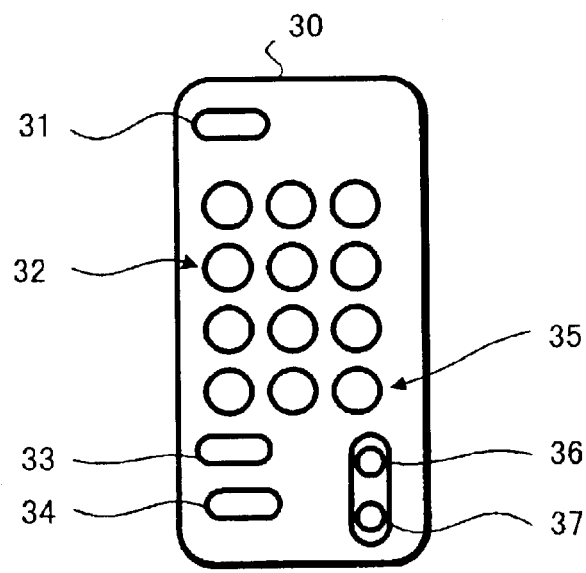
FIG. 2 is a plan view showing keys of a remote controller according to the embodiment of the present invention.

FIG. 2 is a front view showing a remote controller for use with the VTR according to this embodiment. As shown in FIG. 2, a remote controller, generally depicted by reference numeral 30, is a remote controller using infrared rays, and includes at its upper portion a timer clear key 31 for clearing the easy timer set. Also, the remote controller 30 includes ten-keys 32 provided at its central portion under the timer clear key 31. Further, the remote controller 30 includes under the ten-keys 32 an AM/PM enter key 35 for entering AM/PM which is indispensable to the NTSC model VTR. Hereinafter, unless otherwise specified, the VTR to which the present invention is applied will be a PAL model VTR which is commercially available in a large number of countries in the Southeast Asia.

The remote controller 30 includes on its lower end portion under the AM/PM key 35 provided an easy timer set key 33 for starting the easy timer set. The remote controller 30 includes under the easy timer set key 33 provided an SP (short playing)/LP (long playing)/EP (extended playing) key 34 for indicating the tape selection based on the different recording time. Also, the remote controller 30 includes at the right-hand side of the easy timer set key 33 provided an up-key 36 and a down-key 37 for sequentially incrementing and decrementing a numerical value in response to the number or duration of the depressions of the up-key 36 and the down-key 37.

Each time the up-key 36 and the down-key 37 are depressed, the value of time is changed at the unit of minute. In this case, when the user continues to press the up-key 36 and the down-key 37 during a constant period of time T (e.g. 700 msec), the value of time is changed at the unit of 15 minutes. Further, the value of time may be changed in proportion to a duration in which the up-key 36 and the down-key 37 are continually being depressed in such a manner that the value of time may be changed at the unit of 30 minutes when they are continually being depressed during 2T time and at the unit of 60 minutes when they are continually being depressed during 4T time. Furthermore, the up-key 36 and the down-key 37 may be replaced with a rotary element (not shown) which may sequentially increment or decrement the timer-recording value in response to the rotation of the rotary element.

Figure 3:
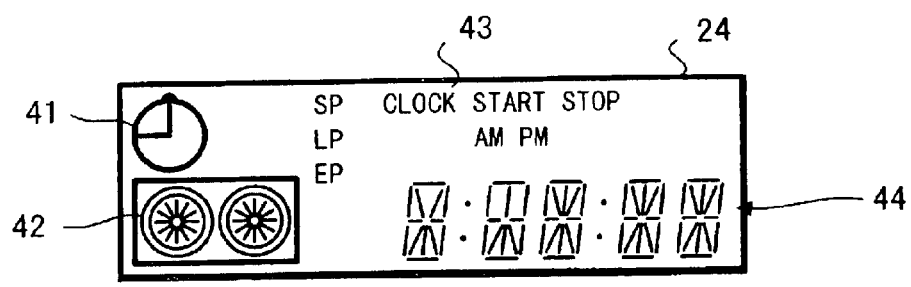
FIG. 3 is a front view showing segments of a fluorescent display tube according to the embodiment of the present invention.

FIG. 3 is a front view illustrating the segment of the fluorescent character display according to the embodiment of the present invention. As shown in FIG. 3, a fluorescent display tube (fluorescent character display) 24 has on its left-hand end portion displayed a timer mark 41 for indicating the timer-activated state and a tape running state mark 42 for indicating a tape running state. Also, the fluorescent character display 40 has on its upper center portion displayed SP, LP, EP for indicating the tape selection based on the different recording time, CLOCK for indicating a present time setting display, START for indicating a timer start time setting display, STOP for indicating a timer end time setting display, APC for indicating auto picture control and AM or PM for indicating AM or PM in the NTSC model. Then, the fluorescent character display 40 has on its lower center portion provided segments 44 at which English letters and digital numbers may be displayed.

Figure 4:
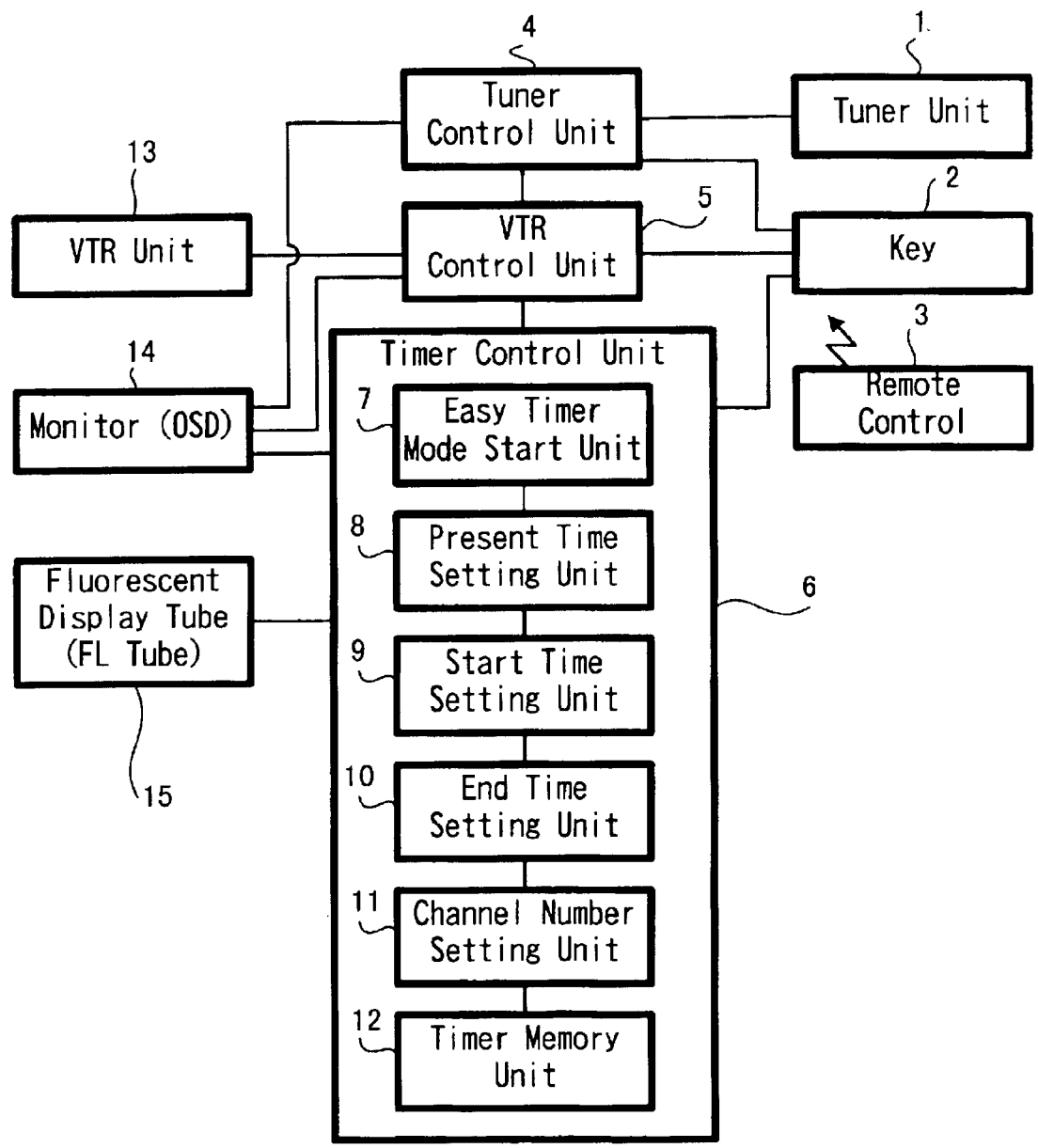
FIG. 4 is a block diagram showing a timer-activated recording apparatus according to the embodiment of the present invention.

FIG. 4 is a block diagram showing the timer-activated recording apparatus according to the embodiment of the present invention.

As shown in FIG. 4, the timer-activated recording apparatus comprises a tuner unit 1 for receiving through an antenna (not shown) a multiplexed signal of a broadcast signal and program relating information outputted from a broadcasting station, a key 2 capable of operating the timer-activated recording apparatus by data entered when it is operated, a remote controller 3 capable of controlling the timer-activated recording apparatus from a remote place, a tuner control unit 4 for decoding the multiplexed signal to output the broadcast signal and the program relating information and which analyzes decoded program relating information, a VTR unit 13 for recording the broadcast signal thus decoded, a VTR control unit 5 for controlling operation of the VTR unit 13, a timer control unit 6 for controlling the VTR unit 13 such that the VTR unit 13 may record a broadcast signal of a desired program in response to the analyzed result obtained from the tuner control unit 4, a monitor 14 capable of displaying various setting pictures on a television receiver in an OSD (on-screen display) fashion and a fluorescent display tube (FL tube) 15 capable of displaying various setting items on its fluorescent display screen. The key 2 corresponds to various keys shown in FIG. 1, the remote controller 3 corresponds to the remote controller 30 shown in FIG. 2, and the fluorescent display tube 15 corresponds to the fluorescent display tube 24 shown in FIG. 3.

As shown in FIG. 4, the timer control unit 6 includes an easy timer-activated mode starting unit 7 energized by data entered by the easy timer set key of the key 2 to start the easy timer mode thereby to display an easy timer set input picture on the monitor 14 or the fluorescent display tube 15, a present time setting unit 8 energized by data entered from the up-key or the down-key of the key 2 to set a present time, a start time setting unit 9 energized by data entered by the up-key and the down-key of the key 2 or data entered by the ten-keys of the remote controller 3 to set a start time, an end time setting unit 10 energized by data entered by the up-key and the down-key of the key 2 or data entered by the ten-keys of the remote controller 3 to set an end time, a channel number setting unit 11 energized by data entered by the up-key and the down-key of the key 2 or data entered by the ten-keys of the remote controller 3 to set a channel number and a timer-recording memory unit 12 for memorizing entry information such as a present time, a start time, an end time, and a channel number and so on.

Although not shown, the timer control unit 6 includes a clock circuit for generating present time information and a recording control circuit for detecting a coincidence between the timer-recording start time/timer-recording recording end time memorized in the timer-recording memory unit and present time information, supplying a recording drive signal to the VTR control unit 5 to start recording operation and supplying a recording stop signal to the VTR control unit 5 to stop recording operation.

The tuner control unit 4 analyzes program relating information, i.e. a program start identification code, a program end identification code and time difference data, and supplies analyzed results to the timer control unit 6.

The recording control circuit in the timer control unit 6 detects a coincidence between present time information based on the clock circuit and the program start time/program end time information memorized in the timer-recording memory unit 12 and based on the analyzed results, controls through the VTR control unit 5 and the VTR unit 13 such that the VTR unit 13 starts or ends recording.

A program received by the tuner unit 1 or a program played back by the VTR unit 13 is displayed on the monitor 14 through the tuner control unit 4 or the VTR control unit 5. Items set relative to the tuner control unit 4, the VTR control unit 5 or the timer control unit 6 operated by the key 2 or the remote controller 3 are displayed on the monitor 14 in an OSD fashion or displayed on the fluorescent display tube 15.

An operation of the timer-activated recording apparatus according to this embodiment will be described with reference to FIGS. 5A though 5D which show displayed states of the fluorescent display tube 15 according to the easy timer set.

Figure 5A:
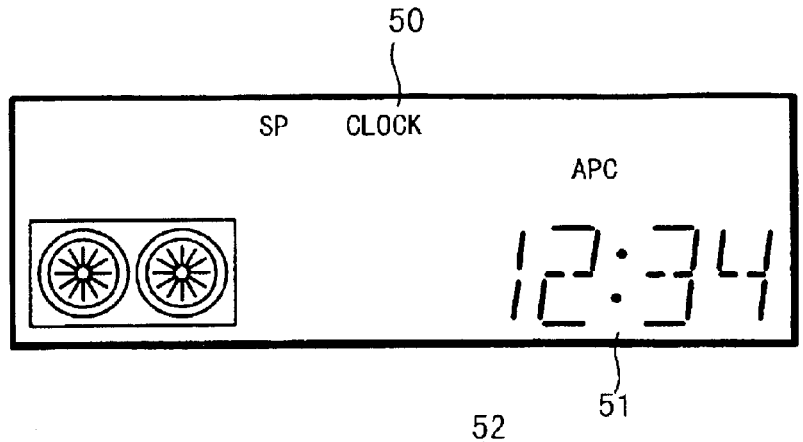

Initially, when the easy timer set key 25 of the key 2 or the easy timer set key 33 of the remote controller 3 is depressed, the timer-activated recording apparatus displays a present time setting display 50 shown by CLOCK in FIG. 5A and is placed in the present time setting mode. To be more concrete, the easy timer-recording mode start unit 7 of the timer control unit 6 recognizes a start input instruction of the easy timer set mode and displays a present time set display 50 on the fluorescent display tube 15 to blink a present time. When a present time is not set, the present time setting unit 8 blinks "__:__" on the fluorescent display tube 15.

When the up-key 26 and the down-key 27 of the key 2 or the up-key 36 and the down-key 37 of the remote controller 30 are depressed, digital numbers from 0 to 23 indicating time and digital numbers from 00 to 59 indicating minute are sequentially incremented or decremented in response to the number of time or duration in which they are depressed, thereby resulting in a present time 51 being blinked as 12:34. Then, when the easy timer set key 25 of the key 2 or the easy timer set key 33 of the remote controller 30 is depressed, the present time setting unit 8 determines the present time.

Figure 5B:
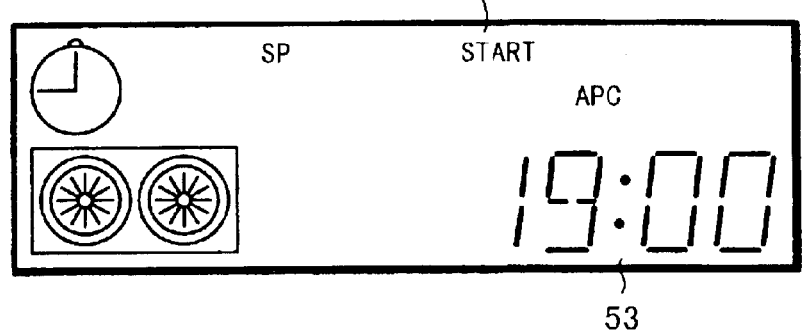

When the present time is determined, then the timer-activated recording apparatus effects a timer start time set display 52 shown by START in FIG. 5B, and is placed in the timer start time setting mode. To be more concrete, the start time setting unit 9 of the timer control unit 6 displays the timer start time setting display 52 on the fluorescent display tube 15 to blink the timer start time. When the timer start time is not yet set, the present time is blinked. When the up-key 26 and the down-key 27 of the key 2 or the up-key 36 and the down-key 37 of the remote controller 30 are depressed, digital numbers are sequentially incremented or decremented in response to the number of times or duration in which they are depressed, thereby resulting in a timer start time 53 being blinked as 19:00. Then, when the easy timer set key 25 of the key 2 or the easy timer set key 33 of the remote controller 30 is depressed, the start time setting unit 9 determines the timer start time.

Figure 5C:
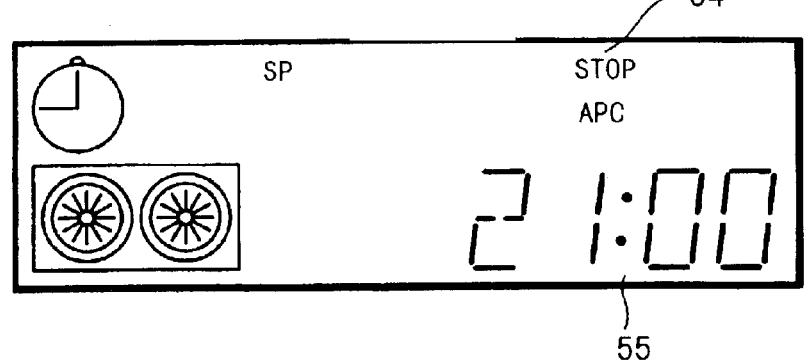

When the timer set start time is determined, then the timer-activated recording apparatus effects a timer end time setting display 54 shown by STOP in FIG. 5C, and is placed in the timer end time setting mode. To be more concrete, the end time setting unit 10 of the timer control unit 6 displays the timer end time setting display 54 on the fluorescent display tube 15 and blinks the timer end time. When an timer end time is not yet set, a timer start time is blinked. When the up-key 26 and the down-key 27 of the key 2 or the up-key 36 and the down-key 37 of the remote controller 30 are depressed, digital numbers are sequentially incremented or decremented in response to the number of time or duration in which they are depressed, thereby resulting in a timer end time being blinked as 21:00. Then, when the easy timer set key 25 of the key 2 or the easy timer set key 33 of the remote controller 30 is depressed, the end time setting unit 10 determines the timer end time.

Figure 5D:
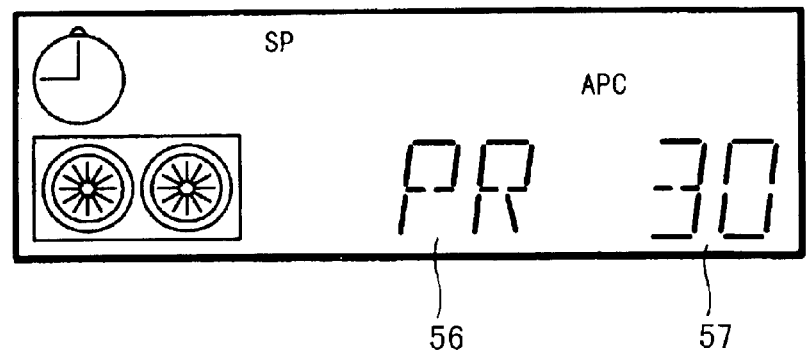

When the timer end time is determined, then the timer-activated recording apparatus displays a channel number setting display 56 shown by PR in FIG. 5D, and is set to the channel setting mode. To be more concrete, the channel number setting unit 11 of the timer control unit 6 displays the channel number setting display 56 on the fluorescent display tube 15 to blink a timer-recording channel number. When a timer-recording channel number is not yet set, a present channel is blinked. When the up-key 26 and the down-key 27 of the key 2 or the up-key 36 and the down-key 37 of the remote controller 30 are depressed, digital numbers are sequentially incremented or decremented in response to the number of time or duration in which they are depressed, thereby resulting in a timer-recording channel number being blinked as 30. Then, when the easy timer set key 25 of the key 2 or the easy timer set key 33 of the remote controller 30 is depressed, the channel number setting unit 11 determines the timer-recording channel number.

When the timer-recording channel number is set, the channel number setting unit 11 memorizes the present time, the timer start time, the timer end time and the timer-recording channel number in the timer-recording memory unit 12 as timer-recording information. Then, when the timer-recording memory unit 12 has finished storing the timer-recording information, the timer control unit 6 deenergizes the timer-activated recording apparatus and the timer-activated recording apparatus is placed in a timer standby mode. When the timer-activated recording apparatus is placed in the timer standby mode, if the timer-activated recording apparatus is of the mode including a buzzer, then a buzzer may be energized a predetermined number of times.

Figure 6:
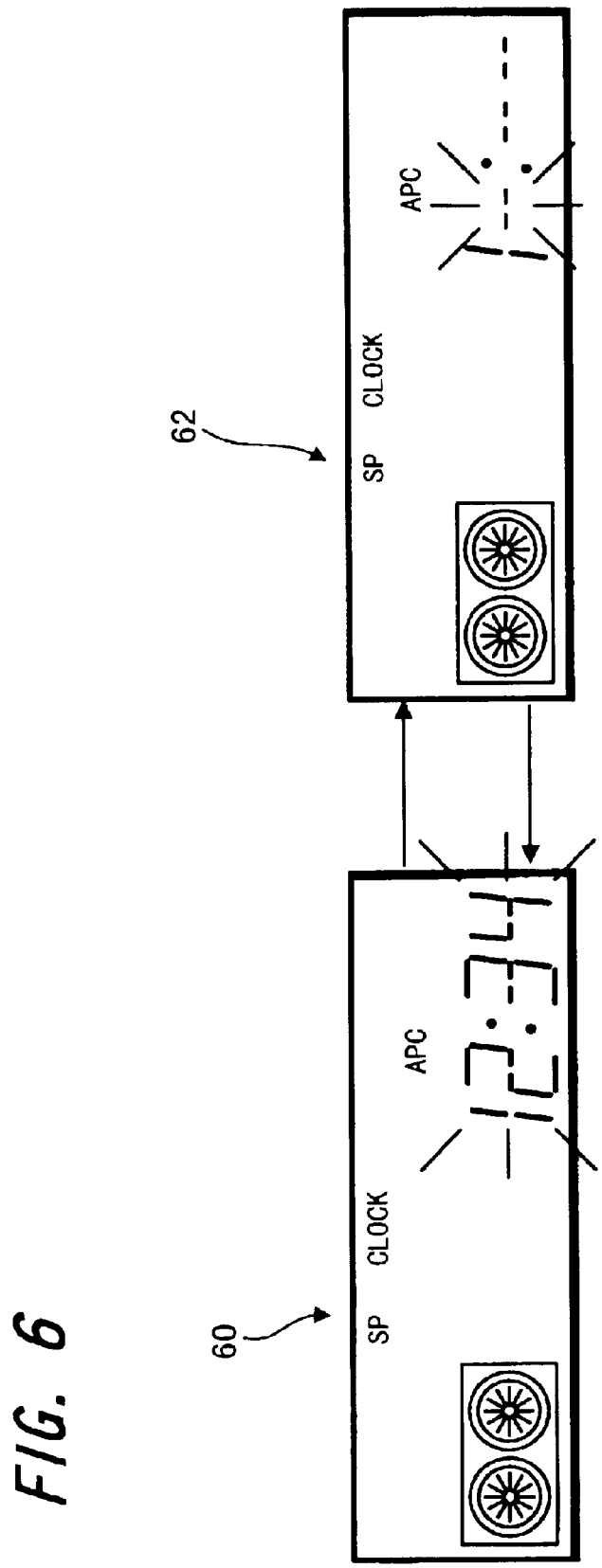
FIG. 6 is a front view showing the manner in which various entry information being set are displayed on the fluorescent display tube in the up/down-key mode and the ten-key mode according to the embodiment of the present invention.

FIG. 6 illustrates the state displayed by the fluorescent display tube in the up-down key mode and the ten-key mode of the easy timer set according to this embodiment. FIG. 6 shows the manner in which the present time is entered by the ten-key 32 of the remote controller 30. When the present time is blinked in an up-down key mode 60, if the ten-key 32 of the remote controller 30 is depressed, then the timer-activated recording apparatus enters a ten-key mode 62. To be more concrete, the start time setting unit 9 of the timer control unit 6 displays the timer start time setting display on the fluorescent display tube 15, thereby resulting in input digit bars being sequentially blinked as "_:_". Each time the ten-key 32 of the remote controller 30 is depressed, the blinking of the input digital bars are sequentially moved from left to right. When the input of four digits is ended, the timer-activated recording apparatus is returned to the up-down key mode 60 from the ten-key mode 62.

In the ten-key mode 62, the start time setting unit 9 of the timer control unit 6 is unable to receive data entered by the up-key, the down-key and the easy timer set key. Also, the start time setting unit 9 is unable to receive data which is in excess of a range of time and minute. In the NTSC model, during the ten-key mode, the user is able to switch AM/PM by using the AM/PM enter key 35 of the remote controller 30. The AM/PM is displayed by the state display of the fluorescent display tube 15. Similarly as described above, the user is able to enter a timer start time, a timer end time and a channel number in the ten-key mode.

The manner in which the easy timer set is displayed in an OSD fashion will be described next with reference to FIGS. 7 to 10.

Initially, an example of a manner in which the easy timer set is displayed in the PAL model will be described with reference to FIGS. 7 and 8.

Figure 7:
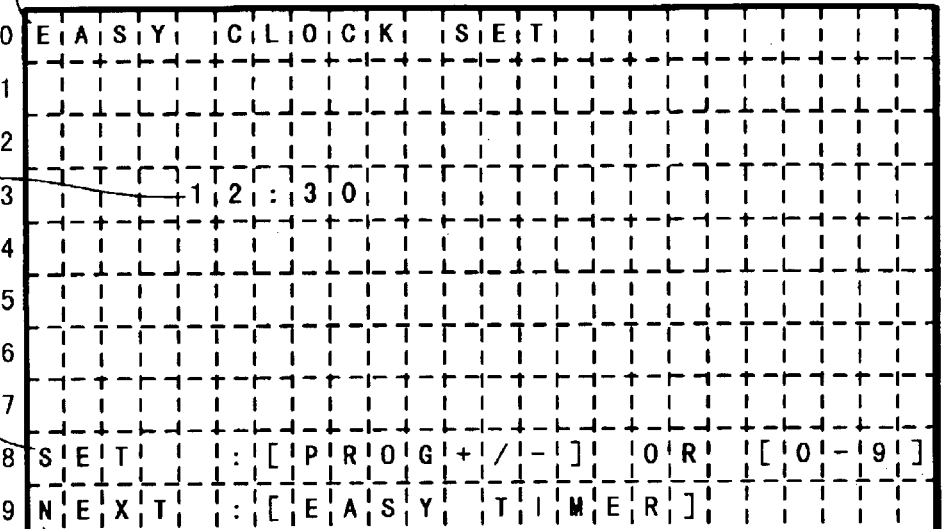
FIG. 7 is a diagram showing the manner in which a present time being set in the easy timer setting mode is displayed on an on-screen display of a monitor according to the embodiment of the present invention.

FIG. 7 is a front view showing the manner in which a setting of a present time in the easy timer set is displayed on the monitor in an OSD fashion.

Referring to FIG. 7, when the easy timer set key 25 of the key 2 or the easy timer set key 33 of the remote controller 30 is depressed, the timer-activated recording apparatus displays a present time setting display 71 as shown by "EASY CLOCK SET" in FIG. 7, and enters the present time setting mode. To be more concrete, the easy timer-recording mode start unit 7 of the timer control unit 6 recognizes an inputted easy timer set start instruction to start the easy timer set mode and displays the present time setting display 71 on the monitor 14 in an OSD fashion. Then, the present time setting unit 8 blinks a present time. When a present time is not yet set, the present time setting unit 8 blinks "_:_" on the monitor 14.

When the up-key 26 and the down-key 27 of the key 2 or the up-key 36 and the down-key 37 of the remote controller 30 are depressed as shown by "SET: [PROG+/−]" in a set key guide 73, digital numbers ranging from 0 to 23 and digital numbers from 00 to 59 are sequentially incremented or decremented in response to the number of time or duration in which they are depressed. Alternatively, when the ten-keys 32 shown as "[0–9]" in the remote controller 30 are depressed, a present time 72 is directly blinked in the form of 12:30. Then, when the easy timer set key 25 of the key 2 or the easy timer set key 33 of the remote controller 30 is depressed as shown by "NEXT: [EASY TIMER]" in a determine key guide 74, the present time setting unit 8 determines the present time.

Figure 8:
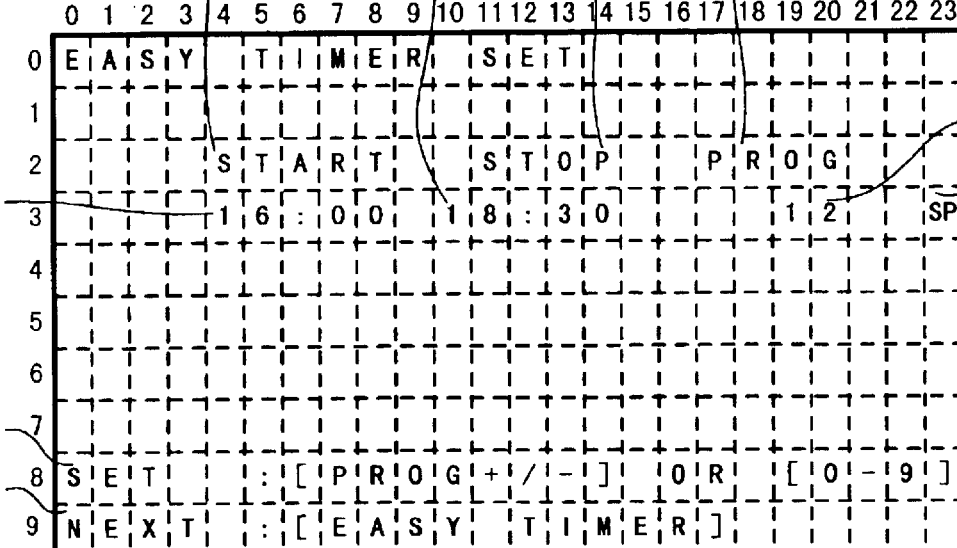
FIG. 8 is a diagram showing the manner in which a timer start time, a timer end time and a channel number being set in the easy timer setting mode are displayed on the on-screen display of the monitor according to the embodiment of the present invention.

FIG. 8 is a front view showing the manner in which a timer start time, a timer end time and a channel number in the easy timer set are displayed on the monitor in an OSD fashion according to this embodiment.

When the present time is determined, then the timer-activated recording apparatus displays "EASY TIMER SET" as shown in FIG. 8. Then, the timer-activated recording apparatus displays a timer start time setting display 81 as shown by "START" and is placed in the timer start time setting mode. To be more concrete, the start time setting unit 9 in the timer control unit 6 displays the timer start time setting display 81 on the monitor 14, thereby resulting in the timer start time being blinked. When the timer start time is not yet set, the present time is blinked on the monitor 14.

When the up-key 26 and the down-key 27 of the key 2 or the up-key 36 and the down-key 37 of the remote controller 30 are depressed as shown by "SET: [PROG+/−]" in a set key guide 88, digital numbers of hours ranging from 0 to 23 and digital numbers of minutes ranging from 00 to 59 are sequentially incremented or decremented in response to the number of time or duration in which they are depressed. Alternatively, when the ten-keys 32 represented as "[0–9]" in the remote controller 30 are depressed, a timer start time 84 is directly blinked as 16:00. Then, when the easy timer set key 25 of the key 2 or the easy timer set key 33 of the remote controller 30 is depressed as shown by "NEXT: [EASY TIMER]" in a determine key guide 89, the start time setting unit 9 determines the timer start time.

When the timer start time is determined, then the timer-activated recording apparatus displays a timer end time setting display 82 shown by "STOP" in FIG. 8, and enters a time end time setting mode. To be more concrete, the end time setting unit 10 in the timer control unit 6 displays the timer end time setting display 82 on the monitor 14, thereby resulting in the timer end time being blinked. When the timer end time is not yet set, a timer start time is blinked on the monitor 14.

When the up-key 26 and the down-key 27 of the key 2 or the up-key 36 and the down-key 37 of the remote controller 30 are depressed as shown by "SET: [PROG+/−]" in the set key guide 88, digital numbers of hours ranging from 0 to 23 and digital numbers of minutes ranging from 00 to 59 are sequentially incremented or decremented in response to the number of time and duration in which they are depressed. Alternatively, when the ten-keys 32 shown by "[0–9]" in the remote controller 30 are depressed, a timer end time 85 is directly blinked as 18:30. Then, when the easy timer set key 25 of the key 2 or the easy timer set key 33 of the remote controller 30 is depressed as shown by "NEXT: [EASY TIMER]" in the determine key guide 89, the end time setting unit 10 determines the timer end time.

When the timer end time is determined, then the timer-activated recording apparatus displays a channel number setting display 83 shown by "PROG" in FIG. 8, and enters a channel setting mode. To be more concrete, the channel number setting unit 11 in the timer control unit 6 displays the channel number setting display 83 on the monitor 14, thereby resulting in a timer-recording channel number being blinked. When the timer-recording channel number is not yet set, a present channel is blinked on the monitor 14.

When the up-key 26 and the down-key 27 of the key 2 or the up-key 36 and the down-key 37 of the remote controller 30 are depressed as shown by "SET: [PROG+/−]" in the set key guide 88, digital numbers indicating channels that can be received are sequentially incremented or decremented in response to the number of time or duration in which they are depressed. Alternatively, when the ten-keys 32 presented as "[0–9]" in the remote controller 30 are depressed, a timer-recording channel number 86 is directly blinked as shown by 12. Then, when the easy timer set key 25 of the key 2 or the easy timer set key 33 of the remote controller 30 is depressed as shown by "NEXT: [EASY TIMER]" in the determine key guide 89, the channel number setting unit 11 determines the timer-recording channel number. Moreover, when SP is selected by the SP/LP/EP key 34 in the remote controller 30, SP is displayed on the monitor 14 as a tape selection 87.

Figure 9:
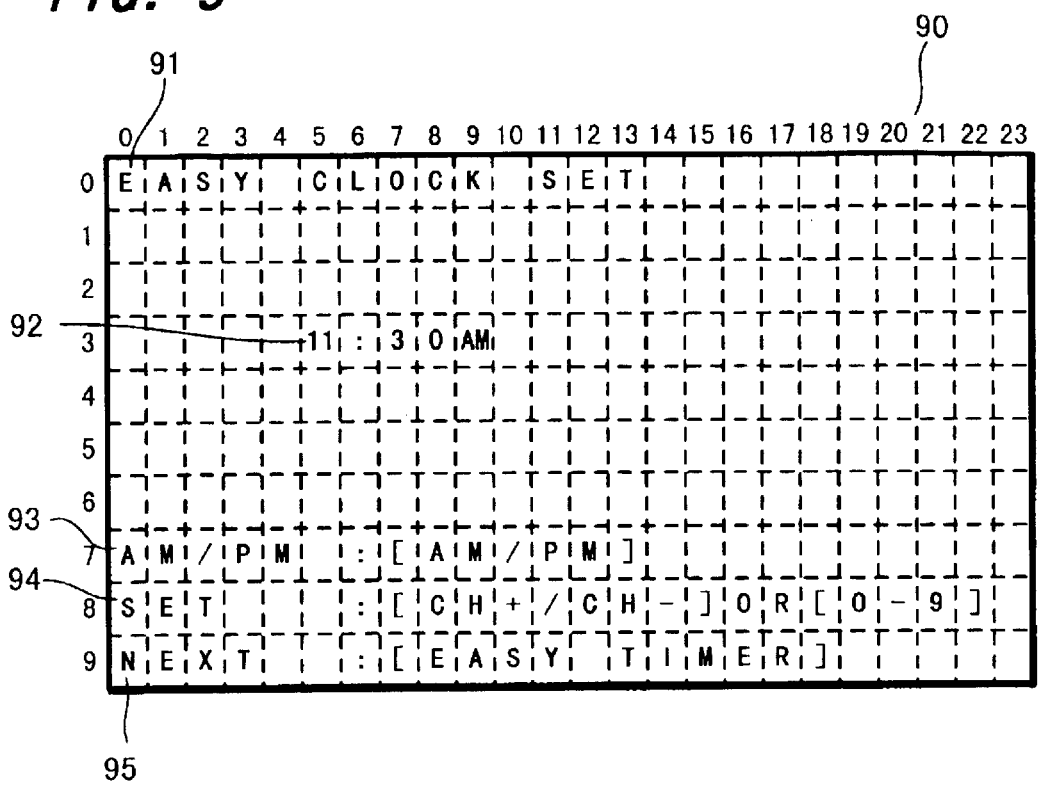
FIG. 9 is a diagram showing the manner in which a present time being set in the easy timer setting mode is displayed on the on-screen display of the monitor based on the NTSC model according to the embodiment of the present invention.
Figure 10:
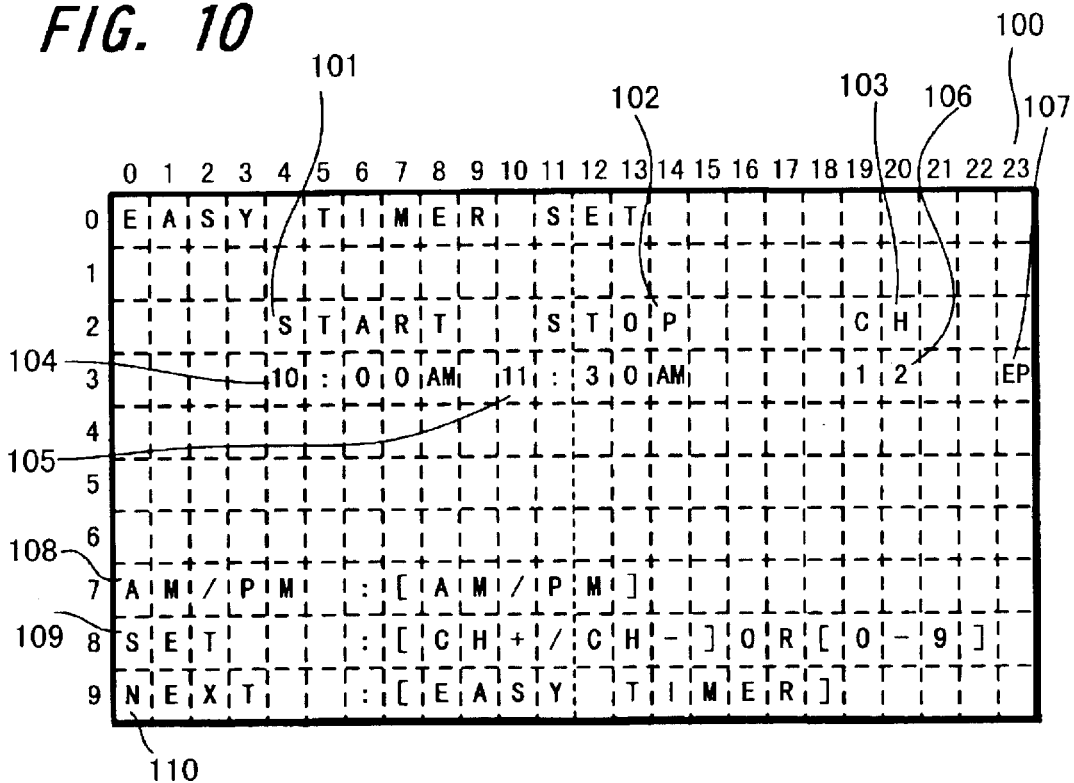
FIG. 10 is a diagram showing the manner in which a timer start time, a timer end time and a channel number being set in the easy timer setting mode are displayed on the on-screen display of the monitor based on the NTSC model according to the embodiment of the present invention.

FIGS. 9 and 10 show examples of the NTSC model.

FIG. 9 is a front view showing the manner in which a present time in the easy timer set is displayed in the NTSC model according to this embodiment.

Referring to FIG. 9, when the easy timer set key 25 of the key 2 or the easy timer set key 33 of the remote controller 30 is depressed, the timer-activated recording apparatus displays a present time set display 91 shown by "EASY CLOCK SET" in FIG. 9, and enters a present time setting mode. To be more concrete, the easy timer mode start unit 7 in the timer control unit 6 recognizes an easy timer set mode start instruction, and starts the easy timer set mode. The easy timer set mode start unit 7 displays the present time setting display 91 on the monitor 14 in an OSD fashion, thereby resulting in a present time being blinked. When the present time is not yet set, the present time setting unit 8 blinks "__:__" on the monitor 14.

As shown by "AM/PM: [AM/PM]" in an AM/PM select key guide 93, AM is selected by the AM/PM enter key 35 in the remote controller 30 and thereby "AM" is displayed on a present time 92. When the up-key 26 and the down-key 27 in the key 2 or the up-key 36 and the down-key 37 in the remote controller 30 are depressed as shown by "SET: [CH+/−]" in a set key guide 94, digital numbers of hours ranging from 0 to 11 and digital numbers of minutes ranging from 00 to 59 are sequentially incremented or decremented in response to the number of time or duration in which they are depressed, whereby the present time 92 is blinked as shown by "11:30AM". Alternatively, when the ten-keys 32 presented in the form of [0–9] in the remote controller 30 are depressed, the present time 92 is directly blinked as shown by "11:30AM". Then, when the easy timer set key 25 in the key 2 or the easy timer set key 33 in the remote controller 30 is depressed as shown by "NEXT: [EASY TIMER]" in a determine key guide 95, the present time setting unit 8 determines the present time.

FIG. 10 is a front view showing the manner in which a timer start time, a timer end time and a channel number in the easy timer set are set in the NTSC model in an OSD fashion according to this embodiment.

When the present time is determined, then the timer-activated recording apparatus displays "EASY TIMER SET" as shown in FIG. 10 to display a timer start time setting display 101 shown by "start", and enters a time start time setting mode. To be more concrete, the start time setting unit 9 in the timer control unit 6 displays the timer start time setting display 101 on the monitor 14, thereby resulting in a timer start time being blinked. When the timer start time is not yet set, a present time is blinked on the monitor 14.

AM is selected by the AM/PM enter key 35 in the remote controller 30 as shown by "AM/PM: [AM/PM]" in an AM/PM select key guide 108, and thereby "AM" is displayed on a timer start time 104. When the up-key 26 and the down-key 27 of the key 2 or the up-key 36 and the down-key 37 in the remote controller 30 are depressed as shown by "SET: [CH+/−]" in a set key guide 109, digital numbers of hours ranging from 0 to 11 and digital numbers of minutes ranging from 00 to 59 are sequentially incremented or decremented in response to the number of time or duration in which they are depressed, thereby resulting in the timer start time 104 being blinked as "10:00AM". Alternatively, when the ten-keys 32 presented in the form of [0–9] of the remote controller 30 are depressed, the timer start time 104 is blinked as shown by "10:00AM" directly. Then, when the easy timer set key 25 in the key 2 or the easy timer set key 33 in the remote controller 30 is depressed as shown by "NEXT: [EASY TIMER]" in a determine key guide 110, the start time setting unit 9 determines the timer start time.

When the timer start time is determined, then the timer-activated recording apparatus displays a timer end time setting display 102 as shown by "STOP" in FIG. 10, and enters a time end time setting mode. To be more concrete, the end time setting unit 10 in the timer control unit 6 displays the timer end time setting display 102 on the monitor 14, thereby resulting in the timer end time being blinked. When the timer end time is not yet set, the timer start time is blinked on the monitor 14.

AM is selected by the AM/PM enter key 35 of the remote controller 30 as shown by "AM/PM: [AM/PM]" in the AM/PM select key guide 108 and thereby "AM" is displayed on a timer end time 105. When the up-key 26 and the down-key 27 in the key 2 or the up-key 36 and the down-key 37 in the remote controller 30 are depressed-as shown by "SET: [CH+/−]" in the set key guide 109, digital numbers of hours ranging from 0 to 11 and digital numbers of minutes ranging from 00 to 59 are sequentially incremented or decremented in response to the number of times or duration in which they are depressed, thereby resulting in the timer end time 105 being blinked as "11:30AM". Alternatively, when the ten-keys 32 presented in the form of [0–9] in the remote controller 30 are depressed, the timer end time 105 is directly blinked as shown by "11:30AM". Then, when the easy timer set key 25 in the key 2 or the easy timer set key 33 in the remote controller 30 is depressed as shown by "NEXT: [EASY TIMER]" in a determine key guide 110, the end time setting unit 10 determines the timer end time.

When the timer end time is determined, the timer-activated recording apparatus displays a channel number setting display 103 shown by CH in FIG. 10 and enters a channel number setting mode. To be more concrete, the channel number setting unit 11 in the timer control unit 6 displays the channel number setting display 103 on the monitor 14, thereby resulting in the timer-recording channel number being blinked. When the timer-recording channel number is not set, a present channel number is blinked on the monitor 14.

When the up-key 26 and the down-key 27 in the key 2 or the down-key 36 and the up-key 37 in the remote controller. 30 are depressed as shown by "SET: [CH+/−]" in the set key guide 109, digital numbers indicating channels that can be received are sequentially incremented or decremented in response to the number of time or duration in which they are depressed, for example a timer-recording channel number is blinked as "12". Alternatively, when the ten-keys 32 presented in the form of [0–9] in the remote controller 30 are depressed, the timer-recording channel number is directly blinked as shown by "12". Then, when the easy timer set key 25 in the key 2 or the easy timer set key 33 in the remote controller 30 is depressed as shown by "NEXT: [EASY TIMER]" in the determine key guide 110, the channel number setting unit 11 determines the timer-recording channel number. Also, when EP is selected by the SP/LP/EP key 34 in the remote controller 30, "EP" is displayed on the monitor 14 as a tape selection 107.

CLOCK in the present time setting display 50 shown in FIG. 5A and FIG. 6 is blinked when the present time is being set. When the timer start time, the timer end time and the channel number are set as shown in FIGS. 5B to 5D, the timer mark 41 sown in FIG. 3 is blinked. When the timer start time is set as shown in FIG. 5B, "START" is blinked. When the timer end time is set as shown in FIG. 5C, "STOP" is blinked.

Within the easy timer set mode according to this embodiment, the tape speed can be constantly switched by selecting the tape with the SP/LP/EP key 34 in the remote controller 30. Also, in the present time setting shown in FIG. 5A, when the up-key 26 and the down-key 27 in the key 2 or the up-key 36 and the down-key 37 in the remote controller 30 are depressed continuously, a time may be incremented or decremented at the unit of 15 minutes from one second.

In each setting of the easy timer set, when the timer clear key 31 in the remote controller 30 is depressed, the timer-activated recording apparatus discards timer-recording data entered so far and is released from this timer-recording mode. Moreover, in each setting of the easy timer set, when the up-key 26 and the down-key 27 in the key 2 are depressed simultaneously, the timer-activated recording apparatus discards timer-recording data entered so far, and is released from this timer-recording mode.

Also, although the present time is not yet set in FIG. 5A, when the easy timer set keys 25 and 33 are depressed, the timer-activated recording apparatus is released from this timer-activated recording mode. Further, when a menu key (not shown) or the power supply key 22 is depressed in this timer-recording setting mode, the timer-activated recording apparatus is released from this timer-activated recording mode.

When the time is not changed in the present time setting in FIG. 5A and the easy timer set keys 25, 33 are depressed, the setting of time is not executed on more time. The reason for this is to prevent an error of second unit from being caused when the present time is reset to 00 second each time the present time is set.

A time out for ending the setting state in which no keys are depressed in the present time setting shown in FIG. 5A, in the timer start time setting and the timer end time setting shown in FIGS. 5B to 5C is set to three minutes.

When the completion of the timer-recording is instructed by depressing the easy timer set keys 25, 33 when the tape is transported, the following message is displayed on the monitor 14 in an OSD fashion. That is, this message is "PLEASE PUSH [ON/STANDBY] TO SET TIMER".

Although eight events indicating items of timer-recording may be memorized in the timer-recording memory unit 12, when eight events are all stored in the timer-recording memory unit 12, the timer-activated recording apparatus is not placed in the easy timer set mode even when the easy timer set keys 25, 33 are depressed but instead "[FULL]" is displayed on the fluorescent character display tube 15. In this case, a message "8 PROGRAMS HAVE ALREADY BEEN SET" is displayed on the monitor 14.

Incidentally, timer-recording data in the easy timer set mode is stored in the highest-order of the vacant event column of eight events memorized in the timer-recording memory unit 12.

While only the easy timer-recording setting mode of the timer-activated recording apparatus according to this embodiment has been described so far, the present invention is not limited thereto, and the easy timer-recording setting mode may be used in a mixed state of the normal timer-recording setting mode in which present date and present time may be set in advance and items such as day of week, start time, end time, channel and so on of a desired program are set when the timer-recording is effected.

The timer-activated recording apparatus according to this embodiment comprises the tuner unit 1 and the tuner control unit 4 serving as the receiving means for receiving the broadcast signal from the broadcasting station, the VTR unit 13 and the VTR control unit 5 serving as the recording means for recording the broadcast signal and the timer control unit 6 serving as the timer-recording setting means for recording the broadcast signal of the desired program on the recording means. In this timer-activated recording apparatus, the timer-activated recording setting means includes the key 2 and the remote controller 3 serving as the input unit capable of inputting predetermined data from the main body or the remote control operation unit, the monitor 14 and the fluorescent display tube 15 serving as the display unit capable of displaying values entered by the input unit, the easy timer setting mode start unit 7 energized by the input data from the input unit to start the easy timer setting mode to thereby display the easy timer input display on the display unit, the present time setting unit 8, the start time setting unit 9, the end time setting unit 10 and the channel number setting unit 11 serving as the setting unit energized by data entered from the input unit to display values concerning the timer-recording on the easy timer input display of the display unit and which determines the values concerning the timer-recording and the timer-recording memory unit 12 serving as the memory unit for storing set values determined by the setting unit, and further includes the easy timer-recording setting mode for effecting the timer-recording only by the easy timer input display. Thus, since only by the easy timer-recording input display based on the easy timer setting mode, the values concerning the timer-recording can be inputted directly and easily inputted by the input unit, the menu picture need not be opened and prior-preparations need not be used. Furthermore, the input unit may have less keys and a desired program may be timer-activated-recorded by a simple operation in a short period of time.

Further, according to the timer-activated recording apparatus of this embodiment, since the values concerning the timer-recording are the present time, the start time and the end time of the broadcast signal and the channel number only, date need not be entered. In the countries or areas in which a user is used to timer-activate-recording a desired program on that day, the easy timer recording input display is effected in the easy timer setting mode, whereby a user can timer-activate-record a desired program only by inputting present time, start time, end time and channel number.

Further, in the timer-activated recording apparatus according to this embodiment, since the easy timer setting mode is started by depressing the easy timer set keys 25, 33 serving as the set keys of the input unit, the easy timer input display can be effected only by depressing the set keys at the input unit. Therefore, values concerning the timer-recording need not be set in advance, and the input of values concerning the timer-recording can be started immediately after the easy timer setting mode is started.

Further, in the timer-activated recording apparatus according to this embodiment, since the values concerning the timer recording are sequentially incremented or decremented in response to the number of depression and duration of depression of the up-keys 26, 36 and the down-keys 27, 37 at the input unit or the rotation of the rotary element or the values concerning the timer recording are directly displayed in the easy timer recording display on the display unit by digital keys, the user may only depress the up-keys and the down-keys of the less number in the incrementing direction or the decrementing direction of the values or may only rotate the rotary element and does not need the complicated key operations. Therefore, the user can input the values concerning the timer recording by a simple operation.

Further, in the timer-activated recording apparatus according to this embodiment, since only by the depressions of the up-keys and the down-keys at the input unit the values concerning the timer recording may be displayed on the easy timer recording display on the display unit and the values concerning the timer recording may be determined by the depression of the set key at the input unit, the values concerning the start of the easy timer setting mode and the timer recording may be set only by depressing the set key, the up-keys and the down-keys, and other keys are not required. Therefore, the user can timer-activated-record a desired program with ease by less keys.

Further, in the timer-activated recording method according to this embodiment comprising the normal timer-recording setting mode in which when a broadcast signal is received from the broadcasting station and the broadcast signal is recorded, a broadcast signal of a desired program is recorded after prior-setting display including a menu display is effected, the timer-activated recording method comprises an input step capable of inputting predetermined data concerning timer-activated setting of the broadcast signal, a display step capable of displaying input values at the input step, an easy timer setting mode start step energized by the data inputted at the input step to immediately start the easy timer setting mode to thereby effect the easy timer-recording input display at the display step, a setting step energized by data entered at the input step to display the values concerning the timer recording on the easy timer-recording input display of the display step and which determines the values concerning the timer recording, and a memory step for memorizing the set values determined at the setting step. Further, this timer-activated recording method includes the easy timer setting mode for effecting the timer-recording only by the easy timer input display and in which the timer-recording setting values based on the easy timer setting mode are set together with the timer-recording set values of the normal timer-recording setting mode in a mixed state. Therefore, the user does not need to effect the prior setting display including the menu display unlike the normal timer-recording setting mode, and a desired program can be timer-activated-recorded by less steps when the easy timer setting input display is effected by the easy timer setting mode. Thus, the user can timer-activate-record a desired program by a simple processing in a short period of time. In addition, the-timer-recording setting values of the easy timer setting mode and the timer-recording setting values of the normal timer-setting mode can be memorized in a mixed state and a desired program can be timer-activated-recorded.

Further, according to the timer-activated recording method of this embodiment, since the values concerning the timer-recording are the present time, the start time and the end time of the broadcast signal and the channel number only, date need not be entered. In the countries or areas in which users are used to timer-activate-recording a desired program on that day, the easy timer recording input display is effected in the easy timer setting mode, whereby a user can timer-activate-record a desired program only by inputting present time, start time, end time and channel number.

Further, in the timer-activated recording method according to this embodiment, since the easy timer setting mode is started by depressing the set keys at the input step, values concerning the timer-recording need not be set in advance, and the input of values concerning the timer-recording can be started immediately after the easy timer setting mode is started.

Furthermore, in the timer-activated recording method according to this embodiment, since the values concerning the timer recording are sequentially incremented or decremented in response to the number of depression and duration of depression of the up-keys and the down-keys at the input step and display on the easy timer input displayed at the display step, the user may only depress the up-keys and the down-keys of less number in the incrementing direction or the decrementing direction of the values or may only rotate the rotary element and does not need the complicated key operations. Therefore, the user can input the values concerning the timer recording by a simple operation.

Furthermore, in the timer-activated recording method according to this embodiment, since only by the depressions of the up-keys and the down-keys at the input step the values concerning the timer recording may be displayed on the easy timer recording display on the display step and the values concerning the timer recording may be determined by the depression of the set key at the input step, the values concerning the timer recording may be set only by depressing the set key, the up-keys and the down-keys, and the process by the other keys are not required. Therefore, the user can timer-activated-record a desired program with ease by less keys.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A recording apparatus including a built-in display, comprising:

receiving means for receiving a broadcast signal transmitted by a broadcast station;

a recording means for recording said broadcast signal;

timer setting means for setting a timer for recording a desired program carried by said broadcast signal; and a control unit for controlling said recording means so that said recording means records said desired program in response to said setting of said timer setting means by a user, wherein said recording apparatus operates in one of a normal timer setting mode and an easy timer setting mode, wherein when the user selects the easy timer setting mode, said timer is set using a menu displayed on said built-in display based on input of a present time, a start time, an end time, and a channel number of said desired program to be recorded, and the user is always prompted by said menu displayed on said built-in display to input said present time when said recording apparatus is in the easy timer setting mode.

2. The recording apparatus as set forth in claim 1, wherein said normal timer setting mode sets said timer by using a day of the week, a start time, an end time and a channel number of said desired program and said easy timer setting mode sets said timer by using the present time, the start time, the end time and the channel number of said desired program.

3. The recording apparatus as set forth in claim 2, wherein said timer setting means includes input means for entering predetermined data and display means for displaying a predetermined display in response to said predetermined data entered with said input means.

4. The recording apparatus as set forth in claim 3, wherein said input means includes a set key and said easy timer setting mode is started by depressing said set key.

5. The recording apparatus as set forth in claim 3, wherein said input means includes an up-key and a value displayed on said display means is sequentially incremented in response to a number of times said up-key is depressed.

6. The recording apparatus as set forth in claim 3, wherein said input means includes a down-key and a value displayed on said display means is sequentially decremented in response to a number of times said down-key is depressed.

7. The recording apparatus as set forth in claim 3, wherein said input means includes a rotary element and a value displayed on said display means is one of sequentially incremented and sequentially decremented in response to a rotation of said rotary element.

8. The recording apparatus as set forth in claim 3, wherein said input means includes a digital key and said display means displays a numeral value in response to a depression of said digital key.

9. The recording apparatus as set forth in claim 4, wherein a value displayed by said display means is determined by depressing said set key during a display in said easy timer setting mode.

10. A recording method for receiving a broadcast signal transmitted by a broadcast station and for recording said broadcast signal in a recording apparatus including a built-in display, said recording method comprising:

a timer setting step for enabling a user to set a timer for recording a desired program carried by said broadcast signal;

a recording step for recording said desired program in response to said setting at said timer setting step, wherein said timer setting step includes a normal timer setting mode and an easy timer setting mode, wherein when the user selects said easy timer setting mode, said timer is set using a menu displayed on said built-in display based on an input of a present time, a start time, an end time, and a channel number of said desired program, and the user is always prompted by said menu displayed on said built-in display to input said present time when said recording apparatus is in the easy timer setting mode.

11. The recording method as set forth in claim 10, wherein said normal timer setting mode sets said timer by using a day of week, said start time, said end time and said channel number of said desired program and said easy timer setting mode sets said timer by using said present time, said start time, said end time and said channel number of said desired program.

12. The recording method as set forth in claim 10, wherein said timer setting step includes an input step for entering predetermined data for setting said timer and a display step for displaying a predetermined value in response to said predetermined data entered at said input step.

13. The recording method as set forth in claim 12, wherein said easy timer setting mode is started by depressing a set key at said input step.

14. The recording method as set forth in claim 12, wherein a value displayed at said display step is sequentially incremented in response to a number of times an up-key is depressed at said input step.

15. The recording method as set forth in claim 12, wherein a value displayed at said display step is sequentially decremented in response to a number of times a down-key is depressed at said input step.

16. The recording method as set forth in claim 12, wherein a value displayed at said display step is one of sequentially incremented and sequentially decremented in response to a rotation of a rotary element at said input step.

17. The recording method as set forth in claim 12, wherein said display step displays a numeral value in response to a depression of a digital key at said input step.

18. The recording method as set forth in claim 13, wherein a value displayed at said display step is determined by depressing said set key during a display in said easy timer setting mode.

* * * * *